(12) United States Patent
Pospisil et al.

(10) Patent No.: US 12,077,961 B2
(45) Date of Patent: Sep. 3, 2024

(54) MODULAR CONSTRUCTION INCLUDING FIRE-SUPPRESSING GASKET

(71) Applicant: UNITED STATES GYPSUM COMPANY, Chicago, IL (US)

(72) Inventors: Frank Pospisil, Oak Park, IL (US); Breton Betz, Centennial, CO (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 195 days.

(21) Appl. No.: 17/648,210

(22) Filed: Jan. 18, 2022

(65) Prior Publication Data

US 2022/0251829 A1 Aug. 11, 2022

Related U.S. Application Data

(60) Provisional application No. 63/148,331, filed on Feb. 11, 2021.

(51) Int. Cl.
*E04B 1/94* (2006.01)
*B32B 3/30* (2006.01)
(Continued)

(52) U.S. Cl.
CPC .............. *E04B 1/948* (2013.01); *B32B 3/30* (2013.01); *B32B 5/02* (2013.01); *B32B 13/14* (2013.01);
(Continued)

(58) Field of Classification Search
CPC .......... E04B 1/3483; E04B 1/94; E04B 1/948; E04B 1/34815; E04H 1/005; B32B 3/30;
(Continued)

(56) References Cited

U.S. PATENT DOCUMENTS 2,871,544 A * 2/1959 Youtz ....................... E04B 1/35
52/261
4,077,170 A * 3/1978 van der Lely ...... E04B 1/34853
52/263
(Continued)

FOREIGN PATENT DOCUMENTS

| EP | 3330447 A1 | 6/2018 |
|---|---|---|
| GB | 2519694 B | 6/2015 |
| RU | 186882 U1 | 2/2019 |

OTHER PUBLICATIONS

International Search Report and Written Opinion received for PCT/US2022/070548, mailed May 24, 2022.

*Primary Examiner* — Brian E Glessner
*Assistant Examiner* — Daniel J Kenny
(74) *Attorney, Agent, or Firm* — Greer, Burns & Crain, Ltd; Philip T. Petti; Pradip Sahu

(57) ABSTRACT

A gasket for installation in a gap defined by adjacent modular construction units, each having a support frame. The gasket includes at least one layer of structural cement panel; and at least one layer of mineral wool, and the at least one layer of said panel and mineral wool has at least one plate recess configured for accommodating a support plate. A modular building construction is provided, including a plurality of modular units, each unit having a steel frame. Four adjacent units of the plurality form an intersection, and support plates are fastened at upper surfaces of corners formed by each frame. The gasket is disposed in a gap defined at the intersection, the gasket having four plate recesses for accommodating the support plates. In still another embodiment, a method of constructing a building made of modular units including the gasket.

9 Claims, 7 Drawing Sheets

(51) Int. Cl.
  *B32B 5/02*    (2006.01)
  *B32B 13/14*   (2006.01)
  *E04B 1/348*   (2006.01)
  *E04H 1/00*    (2006.01)
  *F16J 15/08*   (2006.01)

(52) U.S. Cl.
  CPC ......... *E04B 1/34815* (2013.01); *E04H 1/005* (2013.01); *F16J 15/0825* (2013.01); *B32B 2262/108* (2013.01); *B32B 2307/732* (2013.01); *B32B 2581/00* (2013.01)

(58) Field of Classification Search
  CPC ..... B32B 5/02; B32B 13/14; B32B 2307/732; B32B 2581/00; F16J 15/0825; F16L 15/02
  See application file for complete search history.

(56) References Cited

U.S. PATENT DOCUMENTS

| | | | |
|---|---|---|---|
| 4,283,896 A * | 8/1981 | Fricker | E04C 2/34 52/712 |
| 4,387,544 A * | 6/1983 | Schilger | E04C 3/293 52/600 |
| 4,599,829 A | 7/1986 | DiMartino, Sr. | |
| 4,644,708 A | 2/1987 | Baudot et al. | |
| 5,720,146 A | 2/1998 | Arnold et al. | |
| 5,950,376 A * | 9/1999 | Kemeny | E04B 1/94 52/573.1 |
| 7,445,738 B2 | 11/2008 | Dubey et al. | |
| 7,670,520 B2 | 3/2010 | Dubey | |
| 7,921,609 B2 | 4/2011 | Kordelin | |
| 8,910,490 B2 | 12/2014 | Carr | |
| 10,066,390 B2 | 9/2018 | Pospisil et al. | |
| 11,525,257 B2 * | 12/2022 | Poh | E04B 1/34823 |
| 11,702,845 B2 * | 7/2023 | You | B32B 27/34 428/339 |
| 11,732,465 B2 * | 8/2023 | Austin | E04B 1/3483 52/236.8 |
| 2004/0040223 A1 | 3/2004 | De La Marche | |
| 2006/0150534 A1 | 7/2006 | Window | |
| 2006/0174586 A1 * | 8/2006 | Morandi | E04C 2/292 52/782.1 |
| 2007/0125017 A1 * | 6/2007 | Blount | E04F 13/0835 52/223.1 |
| 2008/0163808 A1 * | 7/2008 | Kordelin | B63B 29/025 52/745.19 |
| 2013/0305629 A1 | 11/2013 | Stephenson et al. | |
| 2014/0123573 A1 * | 5/2014 | Farnsworth | E04B 1/3483 52/79.9 |
| 2015/0184383 A1 * | 7/2015 | Foderberg | B29C 39/10 264/273 |
| 2020/0399889 A1 * | 12/2020 | Pospisil | E04B 1/7608 |

* cited by examiner

MODULAR CONSTRUCTION INCLUDING FIRE-SUPPRESSING GASKET

RELATED APPLICATION

The present application is a Non-provisional of, and claims priority under 35 USC 119 from U.S. Provisional Application Ser. No. 63/148,331 filed Feb. 11, 2021, the contents of which are incorporated by reference.

BACKGROUND

The present invention relates generally to modular construction techniques for erecting multi-story buildings, and more specifically to improve intra-connection of modular units "modules" for improving resistance to the progression of smoke and/or fire between assembled modular units that are assembled to create the modular building.

It is a growing trend to construct multi-story modular buildings, including hotels, apartments, dormitories, classrooms, restaurants and the like using a variety of modular units in different lengths, widths and heights, especially in crowded urban areas where heavy construction equipment has difficulty maneuvering. Modular construction techniques reduce material waste, and since the units are assembled indoors at remote locations, labor costs and working conditions are more closely controlled. Such modules are remotely constructed and assembled, trucked to the building site, then placed in position using a crane. The modules are assembled by stacking vertically, side-by-side or end-to-end, thus providing a variety of configurations of the final building design.

Each module is constructed of a combination of building components utilizing commonly sourced materials including wood and steel. The module components are groups and subgroups of various independent building materials that are combined to create a panel or building element. The panel or building element includes frames, joists, beams, columns, floor cassettes, ceilings and roofs. The panel or building elements are combined with intersecting connections to eventually form a two to six-sided module. A single or a series of parallel, adjacent and/or stacked modules make up the modular building. Modular buildings may be designed as combustible or non-combustible. A suitable module is described in commonly-owned U.S. Pat. No. 10,066,390 which is incorporated by reference.

In constructing such units, it is customary to place steel support or load plates at the corners of each unit as they are stacked on top of each other, so that there is a steel-to steel connection between the plates and the frames of the vertically-adjacent modules that supports the weight of the stack of modules forming the building. Usually, the plates have a thickness or height of approximately ¾ inch and a 4-inch×4-inch periphery. This assembly procedure creates a gap between the vertically stacked units, which extends laterally for the entire horizontal width of the structure, as well as for the entire length of the structure. Similar, vertically projecting gaps are also defined by the placement of laterally adjacent units.

These gaps have a potential for forming smoke or fire passageways or chimneys that potentially enhance the spread of fire from one modular unit to another. Accordingly, building codes require that these gaps are covered at the intersection of modular units on every floor by facing panels of gypsum wallboard, which as is well known in the art, has fire retarding properties. In some cases, the gypsum panels are backed with fiberglass insulation or the like. A drawback of these requirements is the difficulty in durably attaching relatively thin panels of wallboard to existing structures for adequately plugging these gaps. The issue here is that it is extremely difficult to extend the drywall uninterrupted from the top of wall through the floor/ceiling concealed space to the underside of the next adjacent upper deck in modular constructions in order to maintain the wall fire rating. The nature of the modules forces a joint in the drywall between the floor and ceiling assemblies, thereby causing a prohibited fire break. In some cases, the existing techniques are successful in inhibiting the vertical progression of smoke or fire, but not as successful in inhibiting lateral progression.

Thus, there is a need for an improved construction assembly and technique for assembling modular building units which inhibits the progression of smoke and fire between units both vertically and horizontally.

There is also a need for an improved construction assembly and technique for assembling modular building units which replaces the conventional techniques of adding thin strips of wallboard for closing the inter-module gap.

SUMMARY

The above-listed needs are met or exceeded by the present gasket for installation between modular construction units. In a preferred embodiment, the gasket is dimensioned to fill a gap defined between vertically and horizontally adjacent modular units. As such, the gasket has cutouts or plate recesses dimensioned to accommodate the conventional support plates used between modular units. In construction, the present gasket in a preferred embodiment is a combination of layers of structural cement panel and mineral wool. Regarding the structural cement panel, all conventional, cement core, fiber-reinforced panels are contemplated, including Portland cement and magnesium oxide based panels.

Contemplated gasket combinations include a sandwich of a pair of panels with mineral wool inserted between the panels. In another embodiment, the combination includes respective layers of panel and mineral wool, with either layer facing up and the other facing down as the gasket is placed between vertically adjacent modular units. Still another contemplated gasket is a panel layer sandwiched between layers of mineral wool. Other contemplated gaskets are exclusively layers of structural cement panel or mineral wool. In embodiments where the gasket includes a combination of panels and mineral wool, it is preferred that the respective layers are fastened to each other with chemical adhesive. In other embodiments, the gasket is assembled onsite, with one layer placed upon another, in some cases optionally fastened together with adhesive.

By creating a gasket of noncombustible materials (structural fiber cement panel and mineral fiber), once the lower modules are placed, the support plates are installed, the gasket is put into position, and the top modules are placed over the top panel of the gasket. When provided, the mineral wool acts as a compressible sealant. Test fire temperatures for rated walls and floor/ceiling assemblies customarily reach 2000° C. The mineral wool melts at higher temperatures, and thus remains intact and is therefore suitable for the application.

An advantage of the present gasket is that it provides enhanced strength and durability compared to gypsum wallboard panels, allows for installation of building modules without sacrificing the integrity of the code-required fire barrier, while also preventing smoke and fire from travelling up through the cavity created between the two adjacent, same level modules. The present gasket prevents the propagation of smoke and fire from the concealed space of the floor/ceiling assembly from left-to-right (and vice versa), as well as in the vertically extending space between the double walls formed when two modules on the same level are placed beside each other.

More specifically, the present invention provides a gasket for installation in a gap defined by adjacent modular construction units, each having a support frame. The gasket includes at least one layer of structural cement panel; and at least one layer of mineral wool, and the at least one layer of said panel and mineral wool has at least one plate recess configured for accommodating a support plate.

In another embodiment, a modular building construction is provided, including a plurality of modular units, each unit having a steel frame. Four adjacent units of the plurality form an intersection, and support plates are fastened at upper surfaces of corners formed by each frame. A gasket is disposed in a gap defined at the intersection, the gasket having four plate recesses for accommodating the support plates. The gasket is constructed and arranged for insertion into the gap and for blocking passage of smoke and fire in the gap.

In still another embodiment, a method of constructing a building made of modular units includes providing a pair of modular units, each having a steel frame including intersecting beams forming at least one corner, each corner having a support plate; locating the modular units next to each other; providing a gasket that overlaps opposing edges of each modular unit, the gasket having plate recesses dimensioned for accommodating the support plates; and installing a supplemental pair of modular units vertically above the pair of modular units, the supplemental modular units engaging the support plates and also compressing the gasket.

In a preferred embodiment, one plate recess is formed at each of four corners of said panel and said mineral wool. In an embodiment, the gasket has a length corresponding to a length of the modular construction unit. Further, the combined panel and mineral wool layers have a height in the range of 1% to 3 inches. When the gasket is a single layer of panel or mineral wool, the thickness is at least 0.5 inch. In an embodiment, the combined panel and mineral wool layers have a width in the range of 12 to 24 inches in a main portion, excluding the corners.

In an embodiment, the gasket includes an upper panel layer, a lower panel layer, and a middle layer of the mineral wool. In an embodiment, the gasket includes an upper mineral wool layer, a lower mineral wool layer, and a middle layer of the panel. It is further contemplated that the gasket is made of at least one layer of structural cement panel. It is still further contemplated that the gasket includes an upper panel layer, a lower panel layer, and a middle layer of mineral wool. In another embodiment, the gasket includes an upper mineral wool layer, a lower mineral wool layer, and a middle layer of said panel.

DETAILED DESCRIPTION

Figure 1:
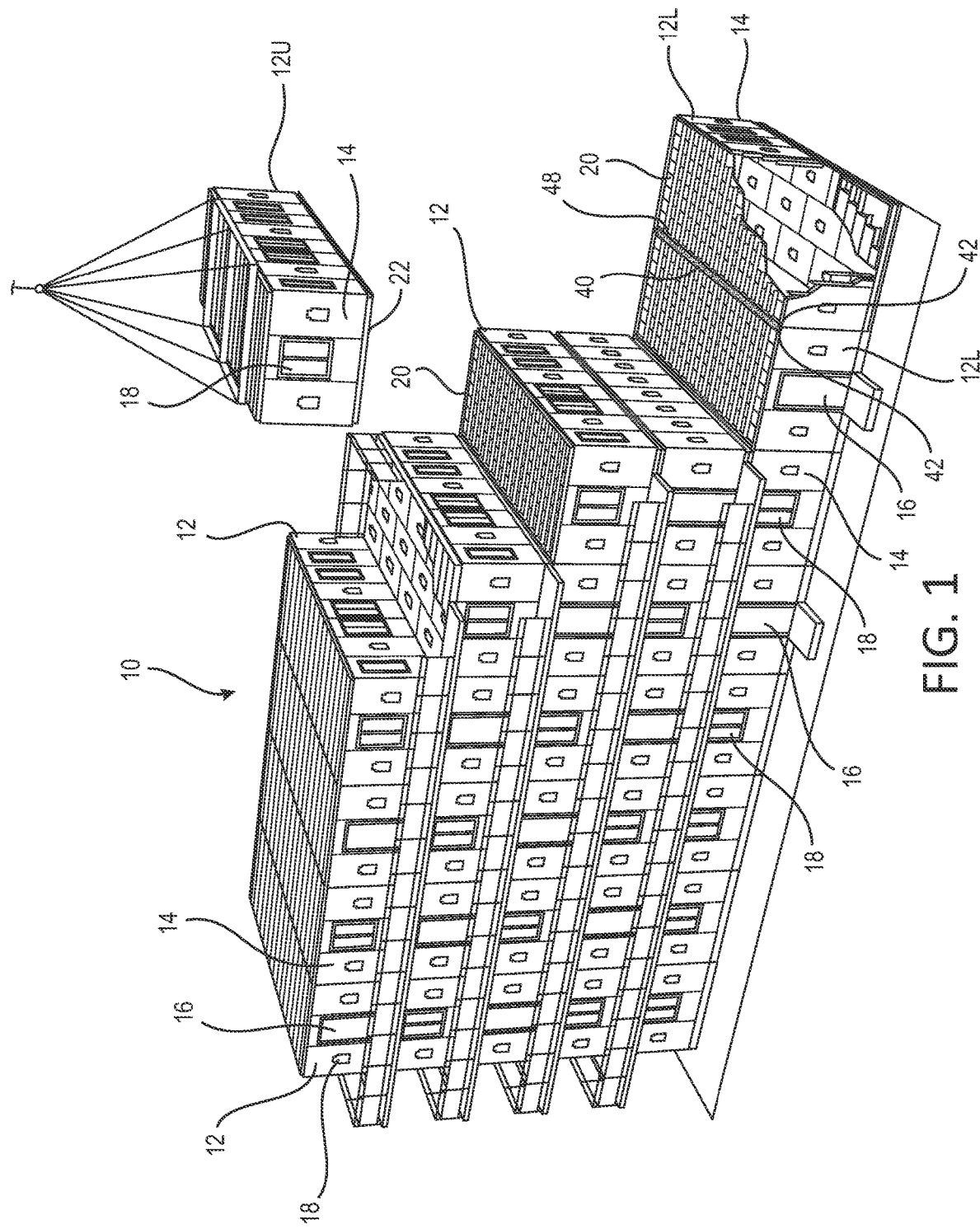
FIG. 1 is a perspective view of a building being made of modular units "modules" of the type equipped with the present gasket.
Figure 2:
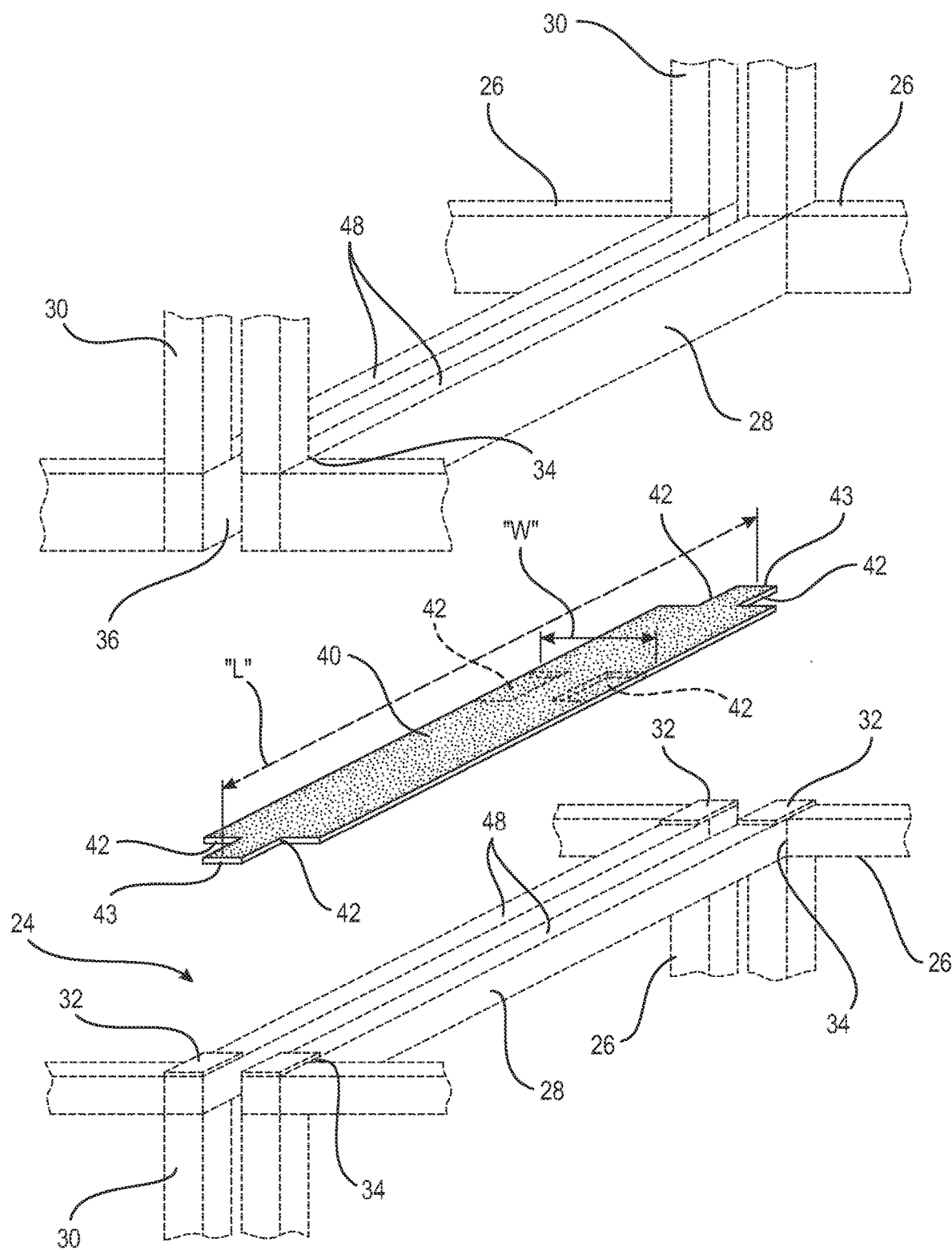
FIG. 2 is a fragmentary exploded junction of four modules of the type illustrated in FIG. 1 showing the disposition of the present gasket.
Figure 3:
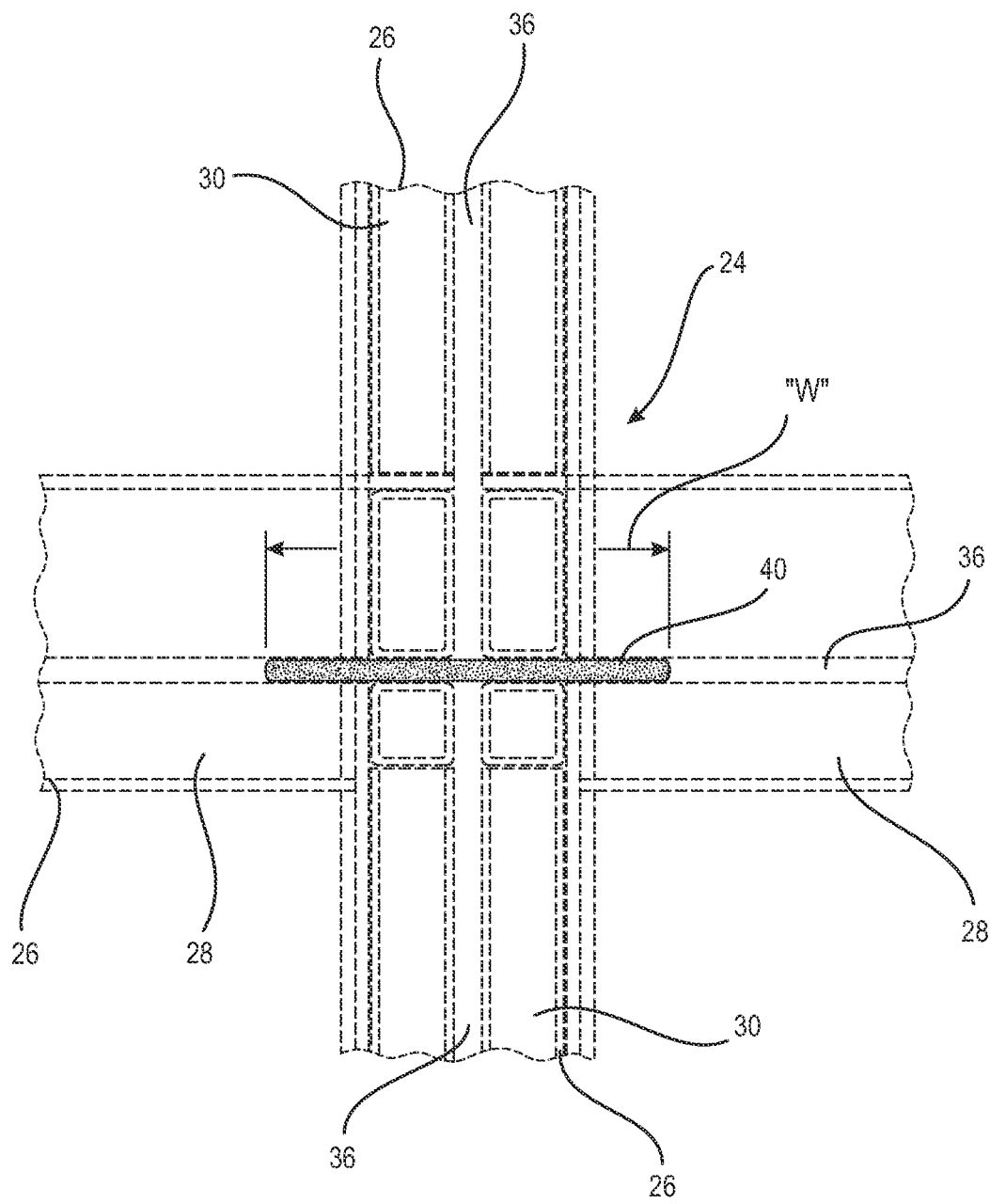
FIG. 3 is a fragmentary assembled vertical cross-section of four modules equipped with the present gasket.

Referring now to FIGS. 1-3, a multi-story building incorporating the present modules is generally designated 10, and includes a plurality of joined module units 12. Each module unit 12 includes a plurality of building elements, panels 14, doors 16 and windows 18. The wall panels 14 are preferably made of structural cement, according to U.S. Pat. Nos. 7,445,738 and 7,670,520 which are incorporated by reference, however other exterior construction panels are contemplated. As described above, structural cement panels 14 are also contemplated as including all conventional, cement core, fiber-reinforced panels, including Portland cement and magnesium oxide-based panels A ceiling 20 of a lower unit 12L becomes part of a floor 22 of an upper unit 12U. Naturally, as the building 10 is provided with multiple stories, an upper module 12U of one floor/ceiling assembly will serve as the lower module 12L of the next higher story. An intersection of four adjacent modular units 12 is generally designated 24 (FIG. 3).

Referring now to FIGS. 2 and 3, the intersection 24 is depicted in greater detail. Each modular unit 12 includes a steel frame 26 including horizontal beams 28 and vertical studs 30 welded or bolted together to form a rigid structure to which the wall panels 14, doors 16 and windows 18 are attached, using threaded fasteners as known in the art. In the preferred embodiment, the ceiling beams 28 (and columns or posts 30) have a minimum height (width) of 3 inches, and are preferably 14 MSG grade steel, however other sizes are contemplated depending on the application. At least one connector or bearing support plate 32 is secured to a corner 34 of the frame 26 defined by joined beams 28 at a 90° angle, preferably by welding. However, other attachment techniques known in the art are contemplated, including threaded fasteners and couplings. In the preferred embodiment, while other sizes are contemplated depending on the application, the connector plate 32 is preferably a minimum ¾-inch thick or having that size height, and is provided in a polygonal shape that is preferably dimensioned 4 inches by 4 inches. Also, the connector plate 32 is used to join the upper unit 12U to the lower unit 12L, again preferably by welding or similar permanent attachment. This construction enhances the integrity and strength of the assembled building 10.

A space, gap or cavity 36 is defined between the upper unit 12U and the lower unit 12L that extends a full length of the units 12, as well as a full height of the units, with the exception of the support plates 32. A gasket 40 is constructed and arranged for filling the space 36 between the upper and lower modular units 12U, 12L where opposing edges of laterally-spaced modules are adjacent each other. Preferably, the gasket 40 includes at least one, and preferably four polygonal plate recesses 42 every 12 feet dimensioned for accommodating the support plates 32 at each corner 34 of the frame 26. In the preferred embodiment, the plate recesses 42 are square in shape, however other configurations are contemplated, depending on the shape of the support plate 32. As seen in FIG. 2, the plate recesses 42 are preferably located at corners of the gasket 40, however, in addition, the recesses are contemplated as being located between ends 43 of the gasket.

The gasket 40 is planar in shape and is constructed and arranged for filling the space 36 at the intersection 24 between vertically adjacent modules 12U, 12L, as well as overlapping laterally adjacent modules to prevent the spread of smoke and/or fire in the space 36. As such, the gasket 40 has a length "L" corresponding to a length of the modular construction unit 12. Further, the gasket 40 has a width "W" in the range of in the range of 12 to 24 inches in a main portion, excluding the plate recesses 42. Preferably, the gasket 40 is made of fire resistant materials. Further, the gasket 40 is constructed to accommodate the compressive forces generated from the weight of the vertically-stacked modules. Thus, while the gasket 40 has a relatively limited width "W" compared to a width of the modules 12, due to the placement of the gasket 40 at the intersection 24, lateral and vertical migration of smoke and/or fire between modules is prevented.

Figure 4:
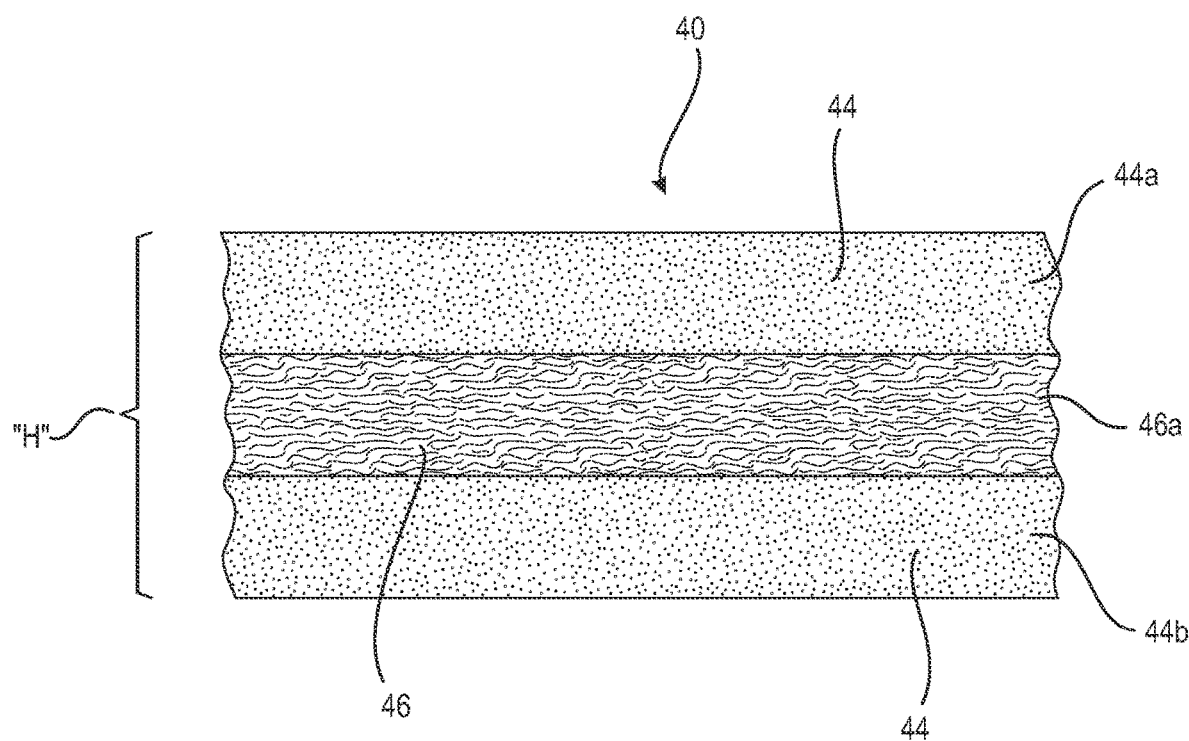
FIG. 4 is a fragmentary vertical cross-section of an embodiment of the present gasket.

Referring now to FIG. 4, in an embodiment, the gasket 40 is made of at least one layer of structural cement panel 44 and at least one layer of mineral wool 46. It is preferred that the structural cement panel 44 is of the type sold by United States Gypsum Co. as Structural Panel Concrete Subfloor, also sold under the trademark STRUCTO-CRETE® panels, and is preferably made according to at least one of U.S. Pat. Nos. 7,445,738 and 7,670,520. In the preferred embodiment, the panels 44 are a minimum ½-inch thick or tall. The mineral wool layer 46 is made of widely available material. As seen in FIG. 2, each of the layers 44, 46 has the plate recesses 42 for accommodating the support plates 32.

In an embodiment, when the gasket 40 includes panel and mineral wool layers 44, 46, the gasket has a height "H" in the range of 1⅞ to 3 inches. As seen in FIG. 4, one embodiment of the gasket 40 features an upper panel layer 44a, a lower panel layer 44b, both layers made of structural cement panels, and a middle layer 46a of mineral wool.

Figure 5:
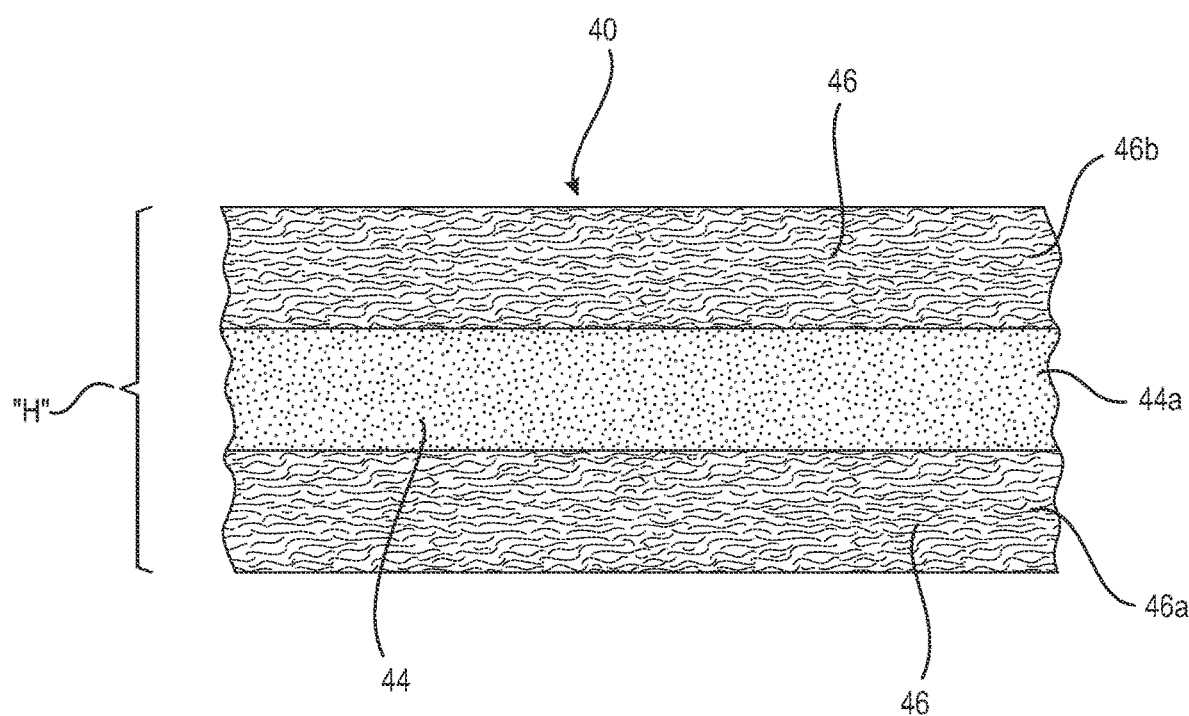
FIG. 5 is a fragmentary vertical cross-section of another embodiment of the present gasket.
Figure 6:
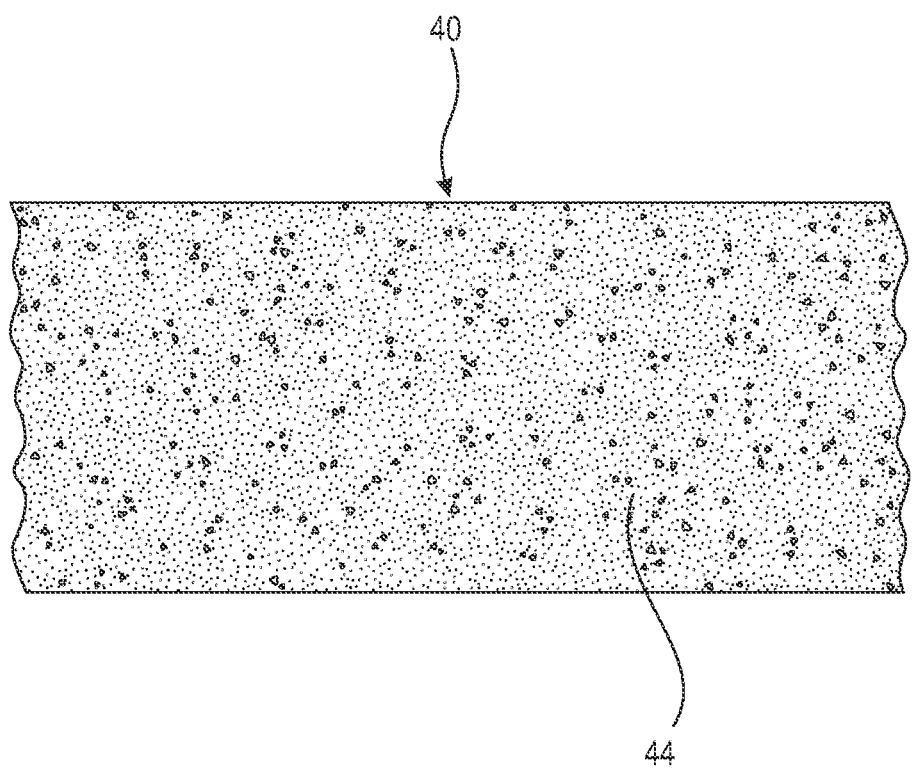
FIG. 6 is a fragmentary vertical cross-section of still another embodiment of the present gasket.
Figure 7:
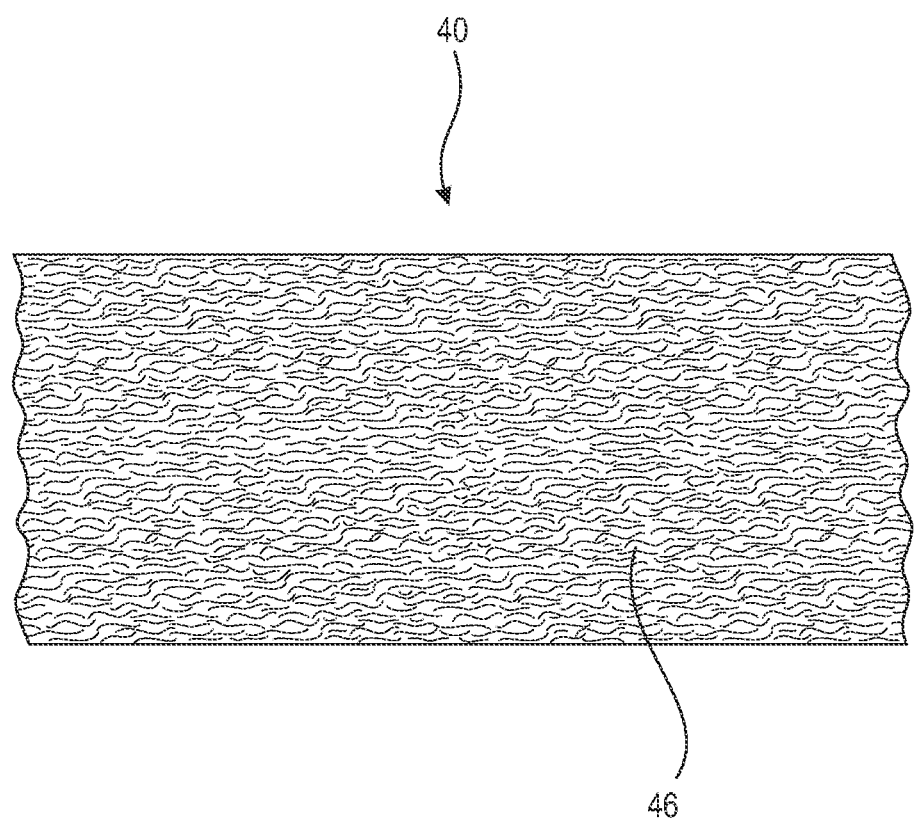
FIG. 7 is a fragmentary vertical cross-section of yet another embodiment of the present gasket.

Referring now to FIG. 5, in another embodiment, the gasket 40 is contemplated as included a layer of panel 44a and a layer of mineral wool 46a, or alternately, a layer of panel 44a sandwiched between layers of mineral wool 46a, 46b. Referring now to FIG. 6, it is further contemplated that the gasket 40 is made of a single layer of panel 44, or, in FIG. 7, a single layer of mineral wool 46.

Referring again to FIGS. 1 and 2, the gasket 40 is shown installed between adjacent modular units 12 in the construction of the modular building 10. It is seen that the gasket 40 is positioned along a common edge 48 of the units 12 and overlaps laterally onto each unit. As such, the disposition of the gasket 40 at the intersection 24 between four modular units 12 prevents both lateral and vertical migration of smoke and/or fire in the space 36 between the units. The plate recesses 42 accommodate the support plates 32 at each corner and/or intermediary points of the frames 26 which form each unit 12.

During construction of the building 10, after placement of a pair of laterally adjacent modular units 12, the support plates 32 are optionally fixed in place on the corners and/or intermediary points 34 of the frame 26. It is also contemplated that the support plates 32 are installed remotely at a factory fabricating the units 12. The gasket 40 is installed along the opposing edges 48 of the adjacent modular units 12 so that the plate recesses 42 are located at the support plates 32. Each gasket 40 thus covers the space 36 between the adjacent modular units 12 and also prevents lateral migration of smoke and/or fire once an additional two supplemental units 12 are placed above the first two modular units and the gasket 40, and the supplemental units are secured in place. When multiple layers of the gasket 40 are provided, the layers of structural cement panel 44 and mineral wool 46 are preferably fastened together with chemical adhesive at a remote factory, or are assembled onsite by placing layers upon each other, and optionally applying chemical adhesive, as by spraying, brushing, rolling or the like as is known in the art.

While a particular embodiment of the present modular construction including a fire-suppressing gasket has been described herein, it will be appreciated by those skilled in the art that changes and modifications may be made thereto without departing from the invention in its broader aspects and as set forth in the following claims.

The invention claimed is:

1. A gasket for installation in a gap defined by adjacent modular construction units, each having a support frame, said gasket, in use, creating a compressible seal between the adjacent construction units and comprising:
   at least one structural cement panel layer; and
   at least one mineral wool layer;
   each said structural cement panel layer and said mineral wool layer being fastened together with chemical adhesive, and each said at least one structural cement layer and at least one mineral wool layer having at least one plate recess configured for accommodating a support plate.

2. The gasket of claim 1, further including one said plate recess at each of four corners of said structural cement panel and said mineral wool.

3. The gasket of claim 1, wherein said gasket has a length corresponding to a length of the modular construction unit.

4. The gasket of claim 1, wherein said structural cement panel and mineral wool layers having a height in the range of 1¾ to 3 inches.

5. The gasket of claim 1, wherein said structural cement panel and mineral wool layers have a width in the range of 12 to 24 inches in a main portion, excluding corners of said combined and fastened gasket, and said gasket has a length longer than said width.

6. The gasket of claim 1, including an upper panel layer and a lower panel layer being said structural cement panel, and a middle layer being said mineral wool.

7. The gasket of claim 1 including an upper layer being said mineral wool, a lower layer being said mineral wool, and a middle layer being said structural cement panel.

8. A gasket for installation in a gap defined by adjacent modular construction units, each unit having a support frame, said gasket comprising:
   at least one structural cement panel layer; and
   at least one mineral wool layer, said at least one structural cement panel layer and at least one mineral wool layer being fastened together using chemical adhesive;
   said at least one layer of said panel and mineral wool being fastened together in sandwich fashion, such that either one of a pair of said at least one structural cement panel layers has a layer of said at least one mineral wool layer therebetween or a pair of said at least one mineral wool layers has a layer of said at least one structural cement panel layer therebetween, and each said at least one layer having at least one plate recess configured for accommodating a support plate.

9. The gasket of claim 8, further including one said plate recess at each of four corners of said structural cement panel and said mineral wool, and said gasket having a length greater than a width of said gasket.

\* \* \* \* \*